United States Patent [19]

Carrico

[11] Patent Number: 5,041,942
[45] Date of Patent: Aug. 20, 1991

[54] EXTENDED-FOIL CAPACITOR AND METHOD OF MAKING SAME

[75] Inventor: Philip H. Carrico, Greenfield Center, N.Y.

[73] Assignee: General Electric Company, King of Prussia, Pa.

[21] Appl. No.: 568,489

[22] Filed: Aug. 16, 1990

[51] Int. Cl.⁵ .......................... H01G 4/38; H01G 7/00
[52] U.S. Cl. .................................... 361/330; 29/25.42
[58] Field of Search ....... 29/25.42; 361/306, 308–310, 361/328–330

[56] References Cited

U.S. PATENT DOCUMENTS

| | | | |
|---|---|---|---|
| 1,480,604 | 1/1924 | Dubilier | 361/330 |
| 2,946,120 | 7/1960 | Jones et al. | 29/470 |
| 3,100,337 | 8/1963 | Dunbar | 29/470.9 |
| 3,377,530 | 4/1968 | Meyers | 361/330 |
| 3,515,958 | 6/1970 | Claypoole et al. | 361/306 |
| 3,806,769 | 4/1974 | Derrick et al. | 317/230 |
| 3,893,223 | 7/1975 | Mims | 228/110 |
| 4,301,354 | 11/1981 | Williams | 219/121 ED |
| 4,422,494 | 12/1983 | Chafin et al. | 164/80 |
| 4,467,397 | 8/1984 | Thiel et al. | 361/328 |
| 4,502,096 | 2/1985 | Malone | 361/308 |
| 4,633,369 | 12/1986 | Lapp et al. | 361/328 |
| 4,826,067 | 5/1989 | Butler | 228/1.1 |

OTHER PUBLICATIONS

Book entitled "Welding Process Technology" by P. T. Houldcroft, Cambridge University Press, 1977, Cambridge, England, pp. 241–244.

Brochure of American Technology, Inc., Milford, CT, entitled Ultrasonic Welding and Automated Assembly Systems, undated.

Article by J. Devine entitled "Joining Metals with Ultrasonic Welding" from Machine Design, 9/20/84 issue (5 pages).

Primary Examiner—Donald A. Griffin
Attorney, Agent, or Firm—Henry J. Policinski; William Freedman

[57] ABSTRACT

This extended-foil capacitor comprises a plurality of flattened foil rolls stacked side-by-side. Each foil roll comprises two sheets of foil rolled up in nesting, face-to-face relationship and dielectric film positioned between said foil sheets and electrically insulating the foil sheets from each other. At one end of each foil roll, one of the foil sheets extends beyond both the dielectric film and the other foil sheet in the roll to provide first foil extensions at said one end of the roll. Adjacent foil rolls in the stack have their first foil extensions positioned adjacent each other at one end of the adjacent rolls. At said one end of the adjacent rolls, there is a joint formed by ultrasonic welding and joining together the first foil extensions. This joint includes within it dozens of superposed foil extensions arranged in a substack and joined together by solid-state metallurgical bonds between juxtaposed foil extensions.

20 Claims, 6 Drawing Sheets

EXTENDED-FOIL CAPACITOR AND METHOD OF MAKING SAME

TECHNICAL FIELD

This invention relates to a power capacitor of the type that comprises a stack of side-by-side rolls of foil, each roll comprising two foil sheets rolled up in nesting relationship and separated by dielectric film. The invention is particularly concerned with a capacitor of this type in which, in each roll, one of the foil sheets is extended beyond the dielectric film at one end of the roll and the other foil sheet is extended beyond the dielectric film at the other end of the roll. Such capacitors are sometimes referred to as extended-foil type capacitors. The invention is also concerned with a method of making such a capacitor.

BACKGROUND

In the multiple-roll, extended-foil type capacitor, it is conventional to provide between the foil extensions at each end of each roll one or more electrical connections located at the end of the roll. It is also conventional to provide suitable electrical connections between the foil extensions of some of the adjacent rolls in the stack and, additionally, between the capacitor terminals and certain of the foil extensions at each end of the stack. Examples of extended-foil capacitors including such connections are shown in U.S. Pat. No. 4,633,369-Lapp et al and 4,467,397-Thiel et al.

The Lapp et al patent discloses the use of mechanical clips for making the connections between the foil extensions, the clips having teeth on their surfaces that penetrate the foil extensions when the clips are compressed about the edges of the foil extensions. This approach is subject to the disadvantage that these mechanical clips are relatively expensive and the additional disadvantage that the resultant joints do not provide metallurgical bonds between the foil extensions, which renders the joints more susceptible to impairment through surface oxidation.

The Thiel et al patent discloses the use of deposited metal along the edges of the foil extensions as part of a soldering process for connecting the foil extensions. A disadvantage of soldering is that it involves the use of heat and molten metal, which if not carefully controlled, can impair the closely-adjacent insulating film between the foil sheets. Furthermore, the foil, which is typically of aluminum, is difficult to join with solder because of the tenacious oxide coating that is typically present on aluminum, thus necessitating reliance upon expensive, labor-intensive soldering procedures, e.g., scrub soldering

OBJECTS

An object of my invention is to provide between the foil extensions at one end of a foil roll in an extended-foil type power capacitor high-quality electrical connections that are relatively inexpensive to make and which provide metallurgical bonds between the foil extensions.

Another object is to provide, between the foil extensions, connections of the character set forth in the immediately-preceding object which can be produced without employing molten metal or significant heat.

Another object is to provide, in an extended-foil capacitor, foil-extension joints in each of which dozens of foil extensions are joined together by metallurgical bonds between juxtaposed foil extensions.

Another object is to provide a method of making connections between the foil extensions which yields high-quality metallurgical bonds between the foil extensions and involves no heat or molten metal that could impair the adjacent dielectric film.

Another object is to provide a method of joining dozens of foil extensions together in a single joint that is inexpensive to make and is characterized by metallurgical bonds between the foil extensions.

SUMMARY

In carrying out the invention in one form, I provide an extended-foil power capacitor that comprises a plurality of flattened foil rolls stacked in side-by-side relationship. Each foil roll comprises two sheets of foil rolled up in nesting, face-to-face relationship and dielectric film positioned between said foil sheets and electrically insulating the foil sheets from each other. At one end of the foil roll, one of the foil sheets extends beyond both the dielectric film and the other foil sheet to provide first foil extensions at said one end of the roll. At the other end of the foil roll, the other foil sheet extends beyond both the dielectric film and the first foil sheet to provide second foil extensions at said other end of the roll.

Adjacent foil rolls in the stack have their first foil extensions positioned adjacent each other at one end of the adjacent rolls and have their second foil extensions positioned adjacent each other at the other end of the adjacent rolls. At said one end of the adjacent rolls, there is a first joint formed by ultrasonic welding and joining together the first foil extensions. At said other end of the adjacent rolls, there is a second joint formed by ultrasonic welding and joining together the second foil extensions. Each of these joints includes within it dozens of superposed foil extensions arranged in a sub-stack and joined together by metallurgical bonds between juxtaposed foil extensions.

BRIEF DESCRIPTION OF FIGURE

For a better understanding of the invention, reference may be had to the following detailed description taken in conjunction with the accompanying drawings, wherein.

DETAILED DESCRIPTION OF EMBODIMENT

Figure 1:
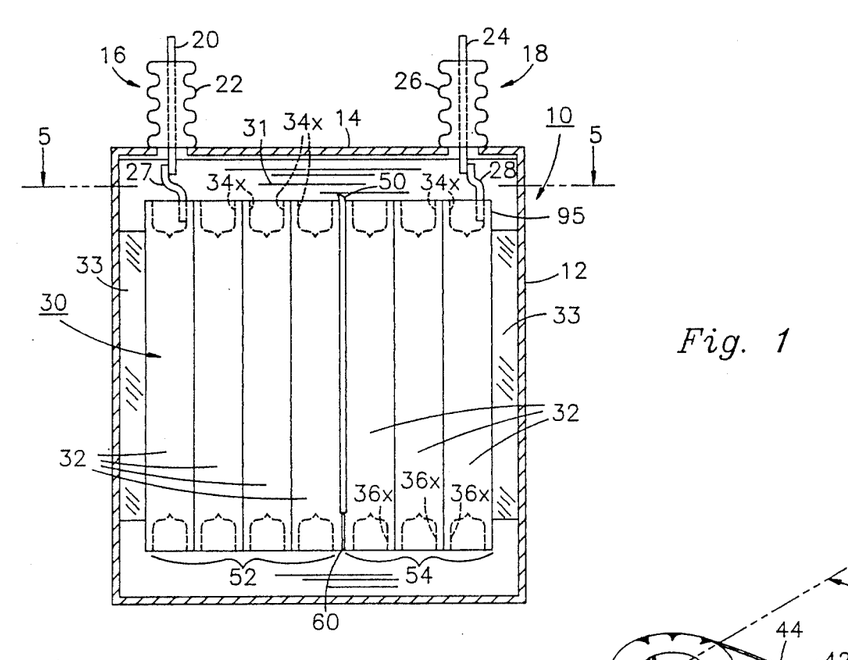
FIG. 1 is a side elevational view partly in section of a power capacitor of the multiple-roll, extended-foil type embodying one form of my invention.

Referring now to FIG. 1, the power capacitor 10 shown therein comprises a metal tank 12 including a top cover 14 sealed to the body of the tank. Extending through the cover 14 are two-spaced apart bushings 16 and 18. Bushing 16 comprises a terminal conductor 20 and a tubular insulating shell 22 surrounding the terminal conductor and insulating it from the metal tank. Bushing 18 comprises a terminal conductor 24 and a surrounding tubular insulating shell 26 insulating the conductor 24 from the tank.

Within the tank 12 is a stack 30 of capacitor elements 32 electrically connected in series with the terminal conductors 20 and 24 by end conductors 27 and 28 in a manner soon to be described in more detail. Compression of the stack is controlled by a pair of insulating spacers 33 located at opposite ends of the stack, each being positioned between the tank end wall and the end of the stack. Additional insulating support means (not shown) is provided within the tank for supporting the stack 30 and electrically insulating it from the metal tank. The tank 12 is filled with a suitable conventional dielectric liquid 31 which completely covers the stack 30 and acts in a conventional manner as an impregnant of the solid insulation within the stack.

Figure 2:
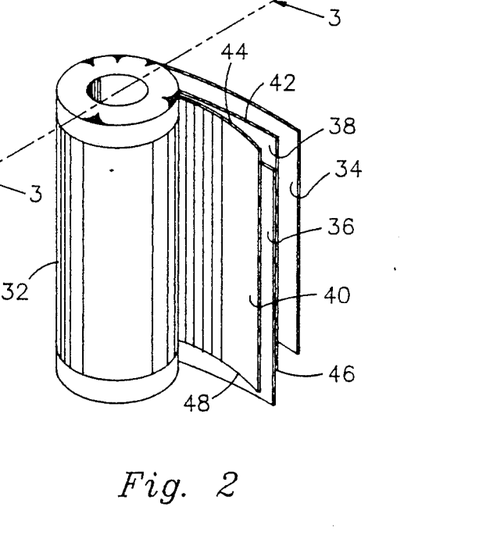
FIG. 2 is a perspective view of one of the foil rolls present in the capacitor of FIG. 1 but before the roll has been flattened for inclusion in a stack of flattened rolls. The illustrated foil roll is still in the cylindrical form in which it was wound and is shown partially unrolled.
Figure 3:
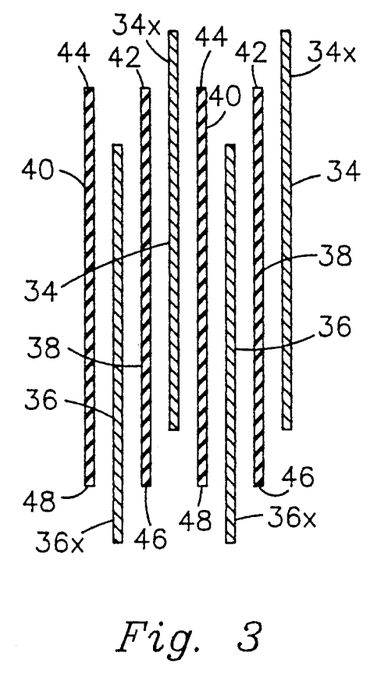
FIG. 3 is a sectional view of the foil roll of FIG. 2 taken in a vertical diametric plane indicated by the line 3—3 of FIG. 2 but illustrating only several layers of the foil and dielectric film constituting the foil roll. The layers of foil and dielectric film are shown in spaced relationship for simplicity.

Each of the capacitor elements 32 is made from a convolutely-wound foil roll of cylindrical form shown in FIG. 2 in a partially unrolled condition. The illustrated foil roll 32 comprises two sheets of metallic foil 34 and 36 and two sheets of dielectric film 38 and 40. These sheets are wound in face-to-face nesting relationship so that the two sheets of metallic foil are separated and electrically insulated from each other by the intervening dielectric film. FIG. 3 is a two layers of these sheets, with the sheets shown slightly separated for clarity in illustration. The foil sheets are preferably of aluminum, and the dielectric film sheets are preferably of polypropylene, both conventional materials for this application.

Referring further to FIGS. 2 and 3, it will be observed that the foil sheets 34 and 36 are laterally staggered with respect to each other and the dielectric sheets 38 and 40 are generally laterally aligned with respect to each other. As a result, at the upper end of the roll one of the foil sheet 34 extends upwardly beyond the upper edges 42 and 44 of the sheets of dielectric film; and at the lower end of the roll the other foil sheet 36 extends downwardly beyond the lower edges 46 and 48 of the dielectric film. As noted hereinabove, a capacitor with such extended foils is sometimes referred to as an extended-foil type capacitor. The extensions of foil 34, which are located at the top of the roll, are designated 34x; and the extensions of foil 36, which are located at the bottom of the roll, are designated 36x.

It will be noted that the lower edge of each of the foil sheets 34 is recessed with respect to the lower edge of the sheets 38 and 40 of dielectric film, and the upper edge of each of the other foil sheet 36 is recessed with respect to the upper edge of the sheets of dielectric film. This recessing provides extra surface creepage distance between adjacent foil sheets 34 and 36. Although, for simplicity of illustration, I have shown only a single sheet of dielectric film between the two sheets of foil, it is to be understood that my invention in its broader aspects comprehends the use of additional sheets of dielectric film between the foils. The term "dielectric film" as used herein is intended to comprehend one or more sheets of dielectric film.

Figure 4:
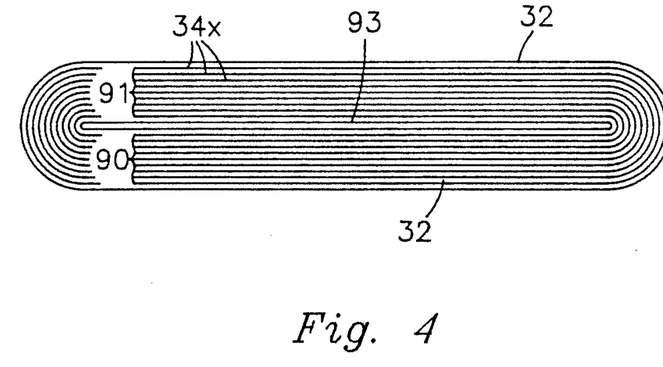
FIG. 4 is an end view of the foil roll of FIG. 2 after it has been flattened for inclusion in a stack of flattened rolls.
Figure 5:
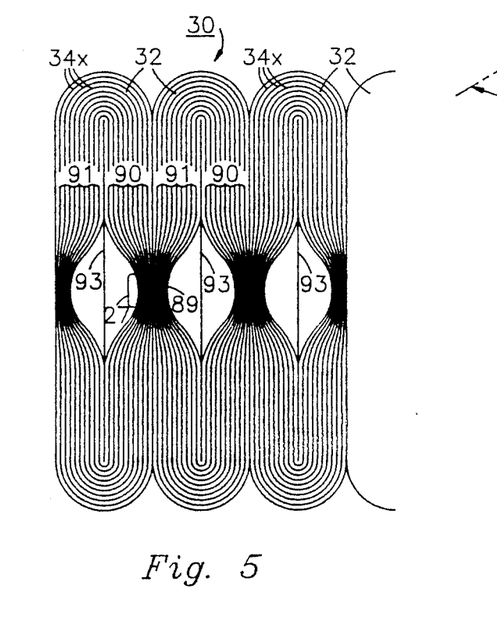
FIG. 5 is an enlarged end, or plan, view of a portion of the stack present in FIG. 1, taken along the line 5—5 of FIG. 1.

The cylindrical foil roll 32 of FIG. 2 is formed in a conventional manner by winding the sheets 34, 36, 38 and 40 upon a suitable mandrel with the desired degree of tightness. The mandrel is then removed, and the cylindrical foil roll is then laterally compressed into a flattened form such as shown in FIG. 4. A plurality of identical flattened foil rolls are formed in the same manner. Then, the flattened foil rolls are placed in side-by-side, laterally-aligned relationship to form a stack of foil rolls, as is depicted in FIGS. 1 and 5. When stacked in this manner, the extensions 34x of the foil electrode 34 at one end of each roll are disposed adjacent corresponding extensions 34x of the foil electrode 34 in the immediately adjacent roll. Similarly, the extensions 36x of the foil electrode 36 at the other end of each roll are disposed adjacent corresponding extensions 36x of the foil electrode 36 in the immediately adjacent roll. If two immediately-adjacent rolls are to have their foil extensions at one end of the two rolls electrically connected together in the capacitor circuit, an electrical connection is made between these extensions in a manner soon to be described. If the capacitor circuit dictates that these extensions not be directly connected, a sheet of suitable dielectric material, such as 50 in FIG. 1, is placed between the adjacent foil extensions of the two adjacent rolls.

In the embodiment of FIG. 1, the stack 30 of capacitor elements 32 is divided into two groups 52 and 54 by the sheet 50 of dielectric material. The four capacitor elements in the group to the left of dielectric sheet 50 are connected in parallel with each other; the three capacitor elements in the group to the right of the dielectric sheet 50 are connected in parallel with each other; and the two groups are connected in series with each other between the terminal conductors 20 and 24. It is understood that my invention is not limited to this particular parallel-series combination, this combination merely being one example of many circuit combinations to which my invention is applicable.

For connecting the capacitor elements, or foil rolls, 32 in the group 52 in parallel, the foil extensions at the top of the foil rolls in group 52 are all electrically connected together and the foil extensions at the bottom of the foil rolls in group 52 are all electrically connected together. Similarly, in the other group 54 the foil rolls are connected in parallel by interconnecting the foil extensions at the top of the rolls and by also interconnecting those at the bottom of the rolls. For connecting the two groups 52 and 54, in series at the bottom of the stack the foil extensions of the juxtaposed rolls of the two groups are electrically connected at 60; and at the top of the stack, the foil extensions of these two juxtaposed rolls are locally insulated from each other by the dielectric spacer 50.

In an individual foil roll, the connection between the foil extensions at each end of the roll provide parallel paths for the current through the foil roll that reduce the portion of the current required to flow in a generally helical path to pass through the foil roll.

Figure 6:
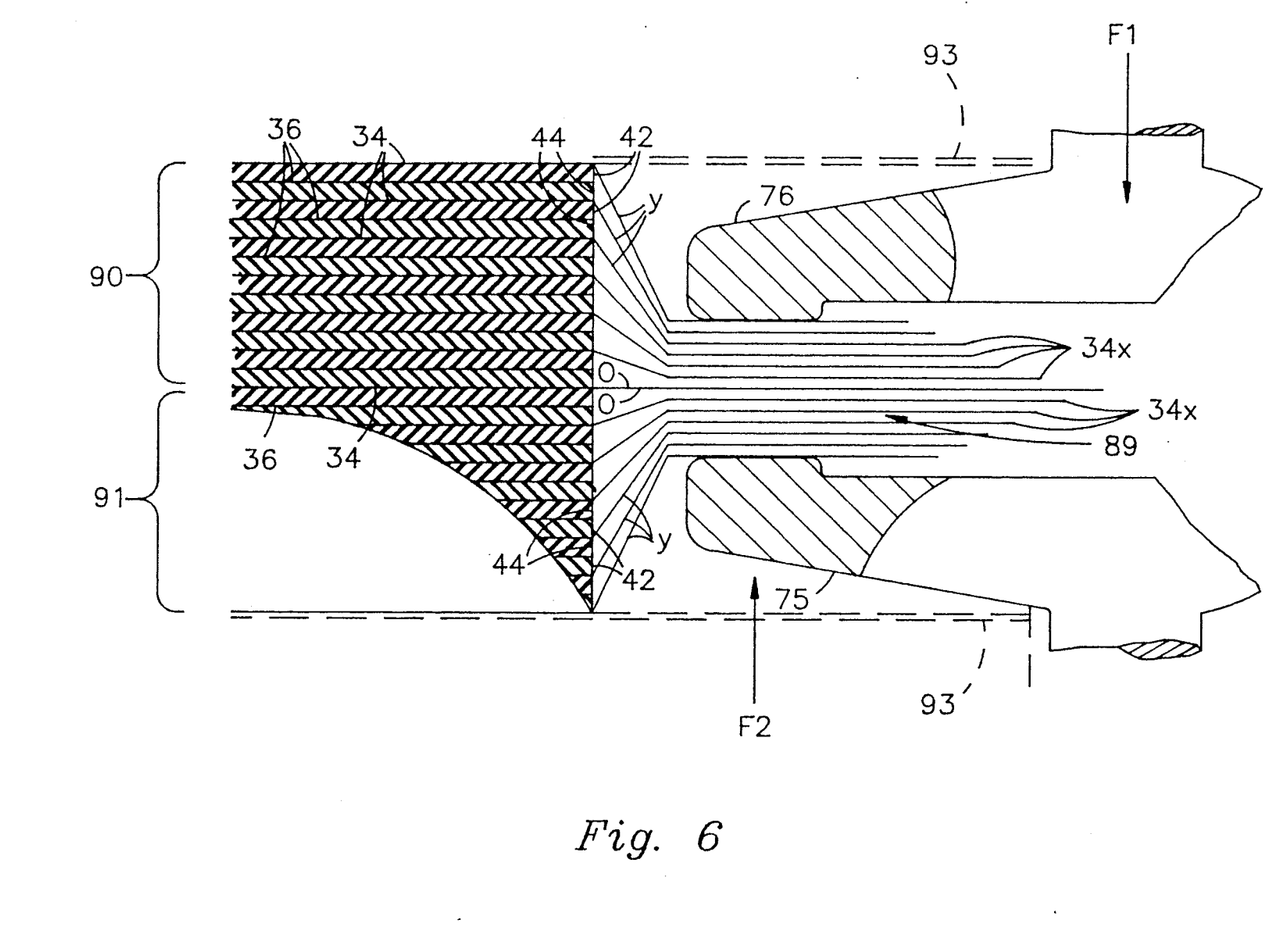
FIG. 6 is a sectional view illustrating an ultrasonic welding operation being performed to join the foil extensions at one end of two adjacent foil rolls.
Figure 7:
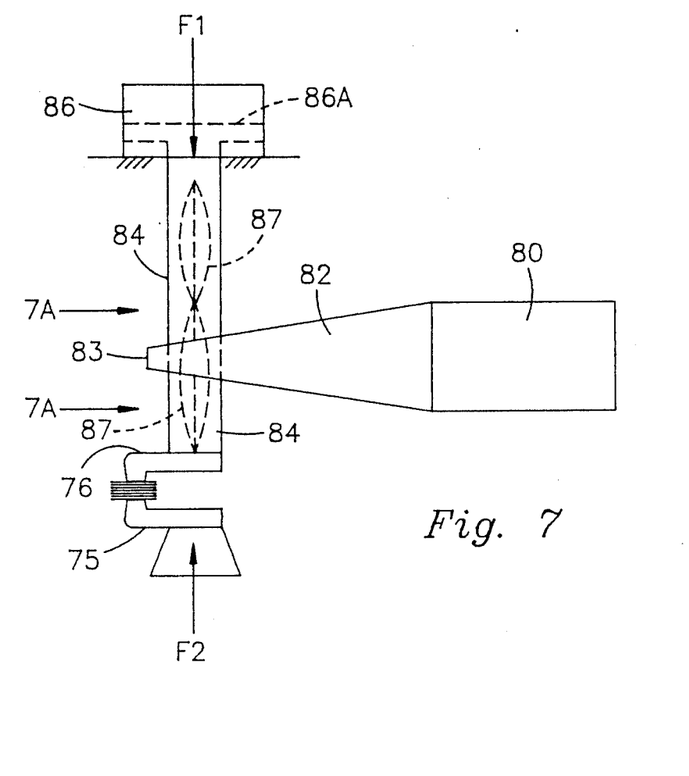
FIG. 7 is a schematic showing of one form of ultrasonic welding apparatus for carrying out the welding operation depicted in FIG. 6.
Figure 7A:
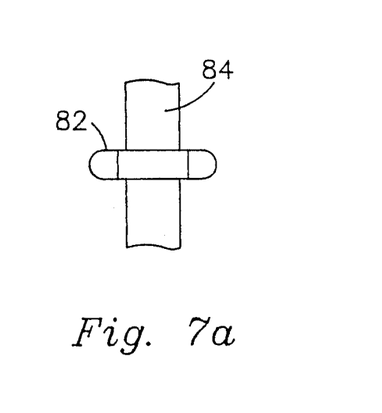
FIG. 7a is a side view of a portion of the apparatus of FIG. 7 looking in the direction of arrows 7A—7A of FIG. 7.

For making the above-described electrical connections, I employ an ultrasonic welding process which is carried out by ultrasonic welding apparatus, one form of which is shown in FIGS. 6 and 7. Referring to FIG. 6, this ultrasonic welding apparatus comprises an anvil tip 75 and a welding tip 76, which are of a special design that permits them to be inserted into the flattened centers of adjacent capacitor rolls and to grip therebetween the foil extensions that are to be joined. The ultrasonic welding apparatus schematically illustrated in FIG. 7 is of the wedge-reed type. Such welding apparatus comprises, for converting electrical energy into mechanical vibrations, a transducer 80 which may be either of the magnetostrictive or piezoelectric type. A suitable electrical power supply (not shown) converts 60 Hz power into high frequency electric power, which, during welding, is supplied to the transducer 80 to drive the transducer at a specified frequency and amplitude.

The output of the transducer 80 is transmitted to the welding tip 76 by means of metallic wedge structure 82 that has its distal end 83 coupled to a vertically-extending metal rod 84 that extends through a closely-fitting opening in the distal end of the wedge structure. A brazed joint is provided between the rod 84 and the surrounding wall of the opening in the wedge 82 to provide a good mechanical connection between these parts 82 and 84. Rod 84 is fixed at its lower end to the welding tip 76 and is vertically movable by a conventional fluid motor 86 having a piston 86a suitably coupled to the top of the rod 84. When parts are to be welded together, they are positioned between the tips 75 and 76; and the fluid motor is actuated to apply a downwardly-acting force FI to the rod 84, thus clamping the parts between the tips 75 and 76. When the parts have been so clamped, vibrations from the transducer are transmitted through the wedge 82 to the rod structure 84, causing this rod structure to vibrate laterally in a reed-like manner, as indicated by the dotted lines 87, and also causing the welding tip 76 to vibrate laterally, i.e., in a generally horizontal direction, which is generally perpendicular to the direction that the force F1 is applied.

The wedge 82 and rod 84 constitute a coupling system between the transducer 80 and the welding tip 76 that magnifies the amplitude of the vibatory energy developed by the transducer and transmits this energy to the welding tip in the form of sound waves, usually above the audio frequency range.

As shown in FIG. 6, when the foil extensions of juxtaposed foil rolls are to be welded together, the flattened centers 93 of the two rolls are opened slightly and the welding tip 76 and the anvil tip 75 are inserted into these flattened centers, thus gathering together between these tips a substack 89 of foil extensions. The tips are then pressed together by oppositely-acting forces F1 and F2 applied to the rod structure 84 and the anvil tip 75, thus squeezing the substack of foil extensions together between the anvil tip and the welding tip. While this squeezing action is occurring, the transducer 80 of FIG. 7 is energized, causing ultrasonic vibrations to be applied to the welding tip 76 and, hence, to the substack 89 of foil extensions. These vibrations, acting in a plane parallel to the interfaces between the foil extensions, produce a shearing action at the interfaces that disrupts and disperses oxides and other contaminants present on the interfaces, thus exposing bare metal at the interfaces. When this occurs, the squeezing pressure urging the foil extensions together effects a solid-state bond between the touching bare metal surfaces. The temperatures developed at the weld interfaces are well below the melting point of the aluminum of the foils, thus allowing the bond to be developed without melting of such metal.

To assist in transmitting the ultrasonic vibrations to the foil extensions being welded, both the welding tip 76 and the anvil tip 75 are provided on their respective faces that engage the foil extensions with many small generally-conical teeth (not shown) projecting toward the other tip. When the tips are pressed together against the substack of foil extensions, these small teeth sink into and locally deform the outermost layers of the relatively soft aluminum foil, thus anchoring those outermost layers to the tips during the ensuing welding operation and thus assisting in the transmission of vibrations through these outermost layers. In practicing the method of my invention in one form, I have employed teeth having a height of about 6 mils. Such teeth are formed by serrating the tip surfaces with a network of shallow grooves, which in this particular embodiment separate the peaks of the teeth by about 0.020 inches. The presence of these teeth also helps to lessen any residual adhesion between the tips and the outer foil extensions after welding, thus permitting clean withdrawal of the tips at such time. Other configurations of the tip surfaces that I have successfully employed are: teeth 4 mils in height and 0.015 inches peak-to-peak and teeth 7.5 mils in height and 0.025 inches peak-to-peak. These teeth configurations are given by way of example and not limitation.

Referring to FIGS. 4, 5, and 6, it will be noted that each foil roll may be thought of as constituting two walls 90 and 91 on opposite sides of its flattened central opening 93. It will be further noted that in each wall most of the foil extensions 34x that are present in a substack such as shown at 89 in FIG. 6 have a portion y located between the substack and the dielectric film of the roll that extends from the dielectric film toward the outer periphery o of the roll. As a result, the joint for each roll is located near the outer periphery of the roll.

The ultrasonic welding apparatus illustrated in FIGS. 6 and 7 is of a conventional design except for the special welding tip and anvil tip. Such a welder (with conventional welding tip and anvil tip) is available from Sonobond Ultrasonics of West Chester, Pennsylvania, as its wedge-reed type of ultrasonic welder.

Figure 8:
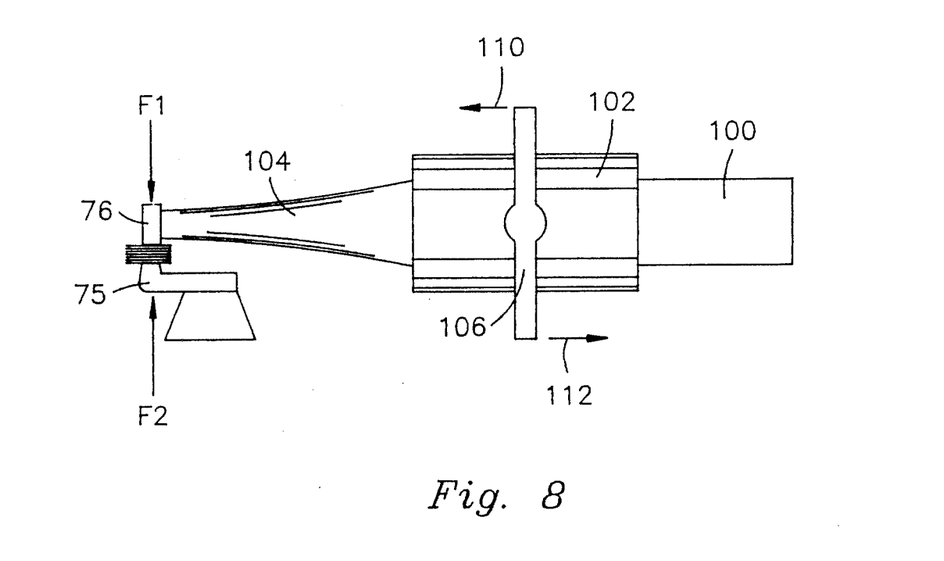
FIG. 8 is a schematic showing of another form of ultrasonic welding apparatus for carrying out the welding operation depicted in FIG. 6.

Another form of ultrasonic welder that can be utilized for effecting the above-described welds is the lateral-drive ultrasonic welder, which is diagrammatically illustrated in FIG. 8. This welder comprises a welding tip 76 and an anvil tip 75 between which the foil extensions to be welded are gripped in substantially the same manner as in the embodiment of FIGS. 6 and 7. This welder also comprises a transducer 100 and a coupling system comprising a block 102 and a welding horn 104 through which vibratory energy is transmitted from the transducer to the welding tip 76. Clamping force Fl is applied to the welding tip 76 through the block 102 and the welding horn 104 by applying a clamp moment 110, 112 to a lever 106 fixed to the block 102. When this occurs, the foil extensions are squeezed together by force F1 and an opposing force F2 acting through the anvil 75.

When the foil extensions are thus squeezed together, energization of the transducer 100 develops ultrasonic vibratory energy which is transmitted through the coupling system 102, 104 to welding tip 76, thus causing ultrasonic vibrations to be applied to the foil extensions in a plane parallel to their interfaces. The combination of these ultrasonic vibrations and the above-described squeezing action, disrupts and disperses oxides on the foil interfaces and thus develops a solid-state bond at these interfaces in substantially the same manner as described in connection with FIGS. 6 and 7.

An important requirement in the type of capacitor that I am concerned with, i.e., a capacitor that includes a combination of solid dielectric and liquid impregnant between foil electrodes, is that the solid dielectric be thoroughly impregnated with the liquid. If the ends of the capacitor roll are significantly blocked by end connections between the foil extensions, liquid will be impeded from passing into the inter-foil space to effect the desired thorough impregnation. When the soldered end connectors of the prior art are present, the extent to which blockage of the ends of the roll can be reduced is limited by the requirement that a relatively large area of the ends must be covered by the solder in order to provide the necessary contact area for high currents. For example, in U.S. Pat. No. 4,467,397-Thiel et al it is specified that the soldered end connections cover about 30 to 50 percent of the end surfaces. I am able to reduce the coverage of the end connections to a much smaller percentage than this because my ultrasonic welds provide such high-quality, low-resistance metallurgical bonds that only a small area is needed for the welded joint By keeping this weld joint area very small, the solid dielectric is more accessible to the liquid dielectric and more likely to be maintained thoroughly impregnated.

While ultrasonic welding is a known metal joining process and has been used heretofore for joining many materials including aluminum and aluminum foil, I am not aware of its prior use for interconnecting in a single joint the many foil extensions at the end of a single or a pair of foil rolls in an extended-foil capacitor. In such an application, there are many dozens, usually hundreds, of superposed foil extensions, or layers, to be joined together in a single joint. This is a very different environment from that of the usual ultrasonic welding application, where there are only two layers to be joined, and where there is only one interface to which ultrasonic vibrations need to be applied to effect bonding. Despite this basic difference and despite some initial failures, I have found that ultrasonic welding is quite feasible for this extended-foil joining application and, in fact, excellent metallurgical bonds can be produced thereby at most of the many dozens of interfaces present.

The exact mechanism by which such a multiple-interface joint is formed during ultrasonic weld is not yet well understood, but it appears that when the ultrasonic vibrations are applied, interfaces near the welding tip and the anvil tip are first bonded together and, then, proceeding inwardly from these interfaces toward the center of the joint, the remaining interfaces are successively bonded together All of this occurs in a fraction of a second.

By way of example and not limitation, the following conditions have been used to effect high quality joints including metallurgical bonds at the interfaces:

| | |
|---|---|
| Weld time | .6 sec |
| Pressure | 4300 psi |
| Area | ¼ × ⅜ inch |
| Foil thickness | .00022 inch |
| Foil layers | 300 |
| Power | 1200 watts |
| Frequency | 20,000 hertz |

The ultrasonic welding apparatus used in this example was of the wedge-reed type shown in FIG. 7. The ⅜ inch dimension of the weld extended circumferentially of the foil roll.

The end conductors 27 and 28 shown in FIG. 1 are connected to the capacitor stack 30 also by ultrasonic welding. In each case, the conductor is connected to a substack of the foil extensions 34x that had already been ultrasonically welded together as above described. More specifically, one end of the conductor 28, for example, is placed in contact with the substack of foil extensions shown at 95 in FIG. 1, and this combination is squeezed between the welding tip and the anvil tip of the ultrasonic welder while ultrasonic vibrations are applied. This produces a good solid-state metallurgical bond between the conductor and the substack at the interface between these two parts. In one embodiment, I construct the conductor 28 of tinned copper and have effected satisfactory bonds between such a conductor and the aluminum foil substack using ultrasonic welding In another embodiment, I construct the conductor of nickel-plated copper; and in still another embodiment, I construct the conductor of aluminum.

Figure 13:
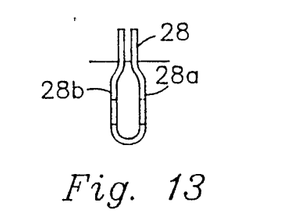
FIG. 13 is a detailed view of a modified form of connection between an end conductor and the capacitor stack of FIG. 1.

In one embodiment of the invention, I make the end conductor 28 of a U-shaped configuration as shown in FIG. 13. Each arm 28a and 28b of the U-shaped conductor is ultrasonically welded to the adjacent capacitor stack, as described in the immediately-preceding paragraph, thus providing two parallel joints through which current can pass between the conductor and the capacitor stack. Should either of these joints become deficient, the other is available for carrying the required current between the conductor 28 and the capacitor stack.

Figure 9:
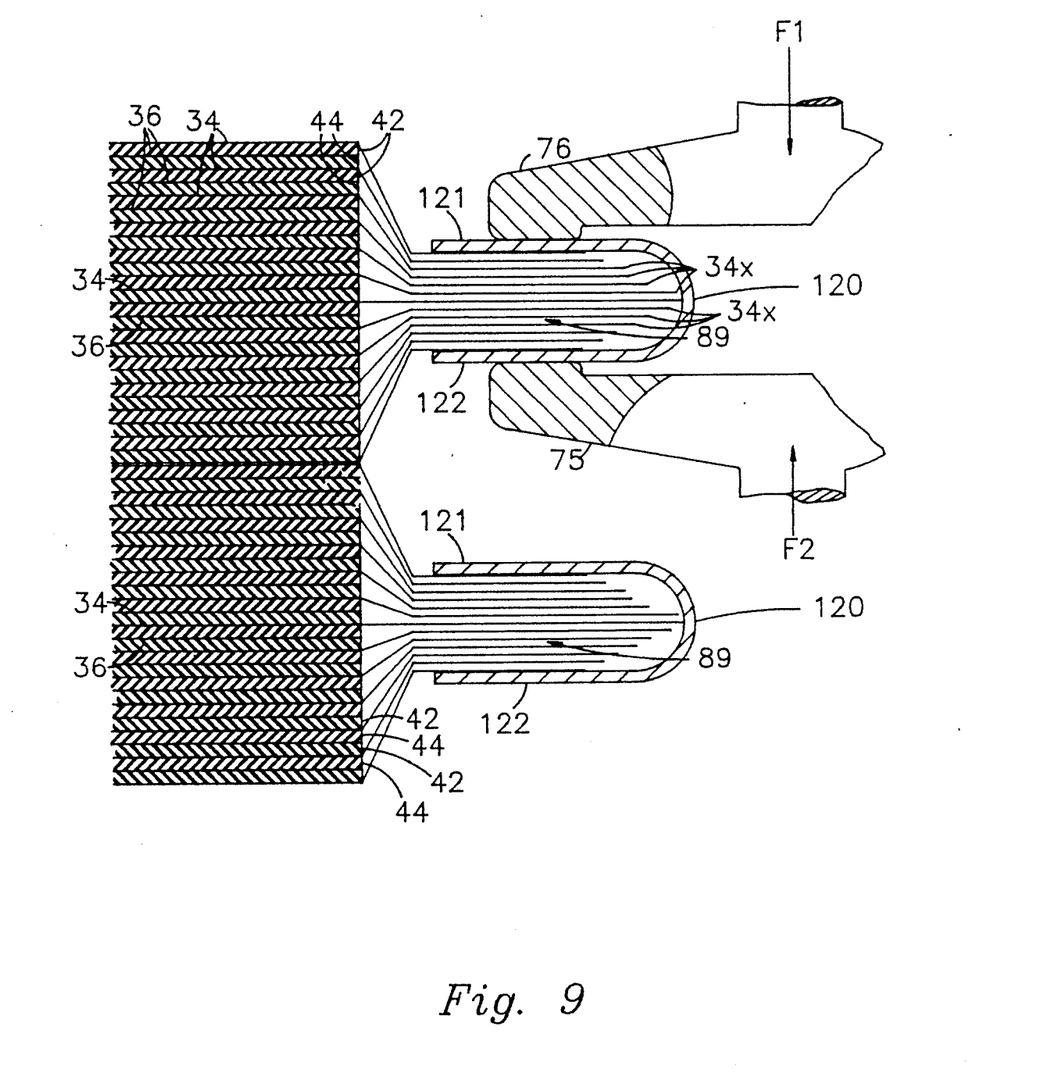
FIG. 9 is a sectional view of a modified form of extended-foil type capacitor and also a modified form of the ultrasonic welding operation being used in the manufacture of this capacitor.

FIG. 9 illustrates a modified form of the invention in which U-shaped metal clips (120) are used for embracing each of the groups of the foil extension that are ultrasonically welded together. Two of these clips are shown in FIG. 9, one embracing the extensions of one wall of a foil roll and the other embracing the foil extensions of the other wall of this foil roll. As a first step in making this type joint, the foil extensions 34x in each wall are gathered together centrally of the thickness dimensions of the associated wall, and one of the U-shaped clips 120 is then slipped over the outer ends of these extensions, thereby forming a substack 89 that includes the legs 121 and 122 of the clip and the foil extensions 34x sandwiched therebetween. The tips 76 and 75 of the ultrasonic welding apparatus are then positioned at opposite ends of this substack and are squeezed together as shown in FIG. 9 by forces F1 and F2. Ultrasonic vibrations are applied to the welding tip 76 in the same manner as above described to effect ultrasonic welding at the interfaces within the substack. Solid-state metallurgical bonds are developed at the interfaces between the foil extensions 34x and also at the interfaces between the clip legs 121, 122 and the outermost foil extensions 34x.

Figure 10:
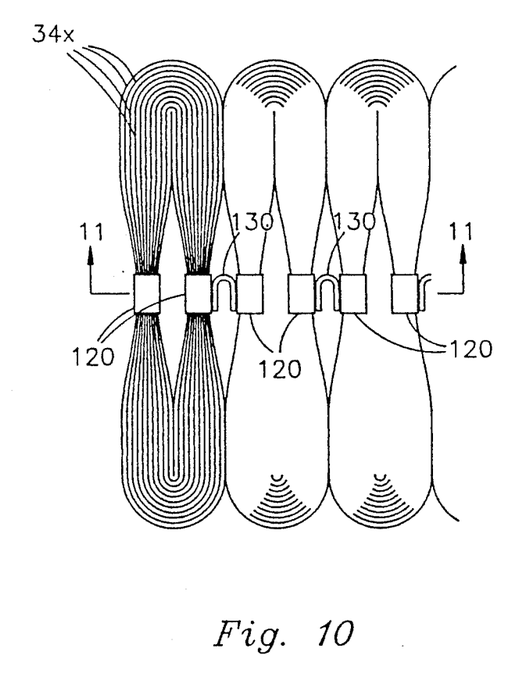
FIG. 10 is an end view of a portion of a capacitor stack of the type illustrated in FIG. 9.

FIG. 10 is an end view of a portion of a capacitor stack that includes capacitor rolls constructed as in FIG. 9. The flattened rolls are stacked in side-by-side relationship as in the embodiment of FIGS. 1–5. Electrical connections between the adjacent ends of adjacent rolls are made by utilizing suitable conductive segments, such as 130, that are suitably joined to the U-shaped clips 120. In FIG. 10 these conductive segments 130 are U-shaped members having legs soldered or joined by ultrasonic welding to the legs of the U-shaped clips 120.

Figure 11:
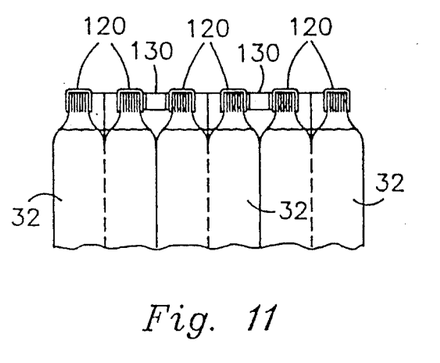
FIG. 11 is a schematic side elevational view of the capacitor stack of FIG. 10, an end portion of which is shown in section taken along the line 11—11 of FIG. 10.

FIG. 11 is a schematic side elevational view of the capacitor stack of FIG. 10, the end portion of which is a sectional view taken along the line 11—11 of FIG. 10. FIG. 11 shows the clips 120 in place and adjacent foil rolls being electrically connected by conductive segments 130 connected between the adjacent clips 120.

Use of the U-shaped clips (120) is advantageous in that such use facilitates gathering together and holding the foil extensions in preparation for the welding operation. When the appropriate extensions have been gathered together, e.g., manually, the clip 120 is slipped over the outer edges of the gathered extensions, and the legs of the clip are squeezed together manually or with a suitable tool to hold the extensions in place. Then the welding tips 75 and 76 can be easily positioned at opposite ends of the resulting substack, as shown in FIG. 9, just prior to the welding step.

Another advantage of using the clips 120 is their presence lessens the tendency of the welding tips to stick to the outer layers of the substack as a result of the ultrasonic welding step. Since the clip legs 121 and 122 are much thicker than the aluminium foil of the foil extensions, there is less tendency of the welding tips to adhere to the legs as a result of the welding operation and the welding tips can be separated from them after the welding operation with less chance of tearing or otherwise damaging them.

Figure 14:
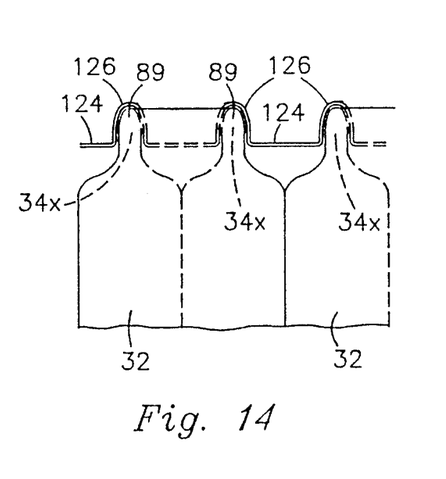
FIG. 14 is a schematic showing of another modified form of capacitor stack, similar to that of FIGS. 9-11.

FIG. 14 illustrates another embodiment of my invention, similar to that of FIGS. 9–11 but utilizing a single strip 124 of conductive metal for electrically connecting a plurality of groups of foil extensions 34x at one end of the capacitor elements, or foil rolls, 32. The strip 124 is of a serpentine configuration and includes U-shaped portions 126 for respectively receiving the groups of foil extensions 34x. Each of these U-shaped portions is ultrasonically welded about a group of foil extensions 34x to form a substack 89 in substantially the same manner as the clips 120 of FIGS. 9–11 are so welded. The foil extensions 34x within each U-shaped portion 126 are bonded together by the ultrasonic welding operation in the same manner as described for FIGS. 9–11.

An advantage of the embodiment of FIG. 14 is that it is simpler than that of FIGS. 9–11, requiring no separate joints or connectors (such as 130) for connecting together the U-shaped portions (126 or 120). Also, the strip 124 provides a direct electrical connection between the U-shaped portions (126) of each foil roll so that current entering the foil roll at one end can enter through either U-shaped portion 126 without first passing through the foil of the roll. It is to be understood that the construction of FIG. 14 can be used at either or both ends of the capacitor stack 30. In one form of the invention, strip 124 is a strip of aluminum 3 mils. in thickness and ½ inch wide.

Figure 12:
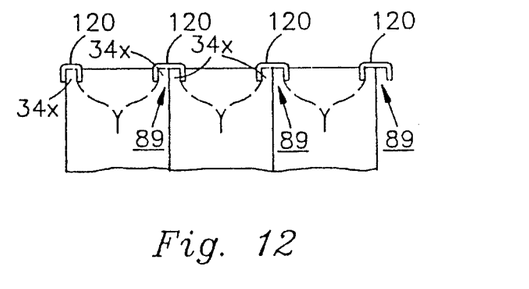
FIG. 12 is a schematic showing similar to that of FIG. 1 except showing another modified form of capacitor stack.

The embodiment of FIGS. 1–5 also lends itself to the use of conductive clips for embracing the foil extensions that are being ultrasonically welded together. This is schematically illustrated in FIG. 12 which is a view of the upper end of the capacitor stack depicted in generally the manner shown in FIG. 1. A U-shaped clip 120 is shown embracing each group of gathered foil extensions 34x to form a substack 89. This substack is placed between the tips of an ultrasonic welding apparatus, squeezed together, and then ultrasonically welded in the same manner as described hereinabove to produce solid-state metallurgical bonds at its interfaces.

In the embodiment of FIG. 12 the clips are advantageous for the same reasons as explained hereinabove in connection with FIGS. 9–11. In addition, in the FIG. 12 embodiment the clip is especially advantageous in locations where two adjacent rolls are interconnected because if, for some reason, there should not be developed a metallurgical bond of the desired high quality between the juxtaposed foil extensions of two adjacent rolls, there is a back-up connection between the rolls through the clips 120.

In still another embodiment of the invention (not shown), a conductive strip of the type shown at 124 in FIG. 14 is used in place of the clips 120 of FIG. 12. In this embodiment the U-shaped members 126 in strip 124 are located where the clips 120 of FIG. 12 are located.

While I have shown and described particular embodiments of my invention, it will be obvious to those skilled in the art that various changes and modifications may be made without departing from my invention in its broader aspects; and I, therefore, intended in the appended claims to cover all such changes and modifications as fall within the true spirit and scope of my invention.

What I claim as new is:

1. An extended-foil power capacitor comprising two flattened foil rolls stacked in juxtaposed side-by-side relationship, each foil roll comprising first and second sheets of metal foil rolled up in nesting face-to-face relationship and dielectric film positioned between said foil sheets and electrically insulating the foil sheets from each other, said first foil sheet extending beyond the dielectric film at one end of the foil roll to provide first foil extensions at said one end of said foil roll and said second foil sheet extending beyond the dielectric film at the other end of the foil roll to provide second foil extensions at the other end of said foil roll, and in which:

(a) said two foil rolls are positioned with respect to each other so that:
  (a1) at said one end of said two juxtaposed foil rolls, said first foil extensions of the two rolls are located adjacent each other, and (a2) at said other end of said two juxtaposed foil rolls, said second foil extensions of the two rolls are located adjacent each other, (b) at said one end of the two rolls, there is a first joint formed by ultrasonic welding joining together said first foil extensions, (c) at said other end of the two rolls, there is a second joint formed by ultrasonic welding joining together said second foil extensions, and (d) each of said joints comprises a substack of dozens superposed of foil extensions joined together by solid-state metallurgical bonds at the interfaces between juxtaposed foil extensions.

2. A capacitor as defined in claim 1 and further comprising a terminal conductor and conductive means for connecting said terminal conductor to one of said foil rolls, said conductive means comprising a conductor that is joined to one of said substacks by a solid-state metallurgical bond formed by ultrasonic welding.

3. The capacitor of claim 1 in which said first joint comprises a U-shaped clip embracing said first foil extensions, said clip comprising two spaced-apart legs at the outer ends of the associated substack joined to the foil extensions of said substack located immediately adjacent said legs by solid-state metallurgical bonds formed by ultrasonic welding.

4. The capacitor of claim 1 in which:
(a) each of said flattened foil rolls includes two walls at opposite sides of a flattened central opening, one of said walls including the foil extensions that are present in one of said substacks, and
(b) in said one wall of each foil roll, most of the foil extensions that are included within said one substack each have a portion located between the substack and the dielectric film of said roll that extends from the dielectric film toward the outer periphery of the roll.

5. The capacitor of claim 1 in which:
(a) each of said flattened foil rolls includes two walls at opposite sides of a flattened central opening, one of said walls including the foil extensions that are present in one of said substacks, and
(b) in said one wall the foil extensions that are included within said one substack are located centrally of the thickness of said one wall.

6. The capacitor of claim 5 in which the joint that includes said one substack comprises a U-shaped clip embracing the foil extensions in said one substack, said clip comprising two spaced-apart legs at the outer ends of the associated substack joined to the foil extensions of said substack located immediately adjacent said legs by solid-state metallurgical bonds formed by ultrasonic welding.

7. An extended-foil power capacitor comprising two flattened foil rolls stacked in juxtaposed side-by-side relationship, each foil roll comprising first and second sheets of metal foil rolled up in nesting face-to-face relationship and dielectric film positioned between said foil sheets and electrically insulating the foil sheets from each other, said first foil sheet extending beyond the dielectric film at one end of the foil roll to provide first foil extensions at said one end of said foil roll and said second foil sheet extending beyond the dielectric film at the other end of the foil roll to provide second foil extensions at the other end of said foil roll, and in which:
(a) said two foil rolls are positioned with respect to each other so that at said one end of said two juxtaposed foil rolls, said foil extensions of the two rolls are located adjacent each other,
(b) at said one end of the two rolls, there is a first joint formed by ultrasonic welding joining together said first foil extensions, and
(c) at said one end of one of the two rolls, there is a second joint formed by ultrasonic welding joining together the foil extensions of said one roll,
(d) each of said joints comprises a substack of dozens superposed foil extensions joined together by solid-state metallurgical bonds at the interfaces between juxtaposed foil extensions.

8. A capacitor as defined in claim 7 and further comprising a terminal conductor and conductive means for connecting said terminal conductor to said one foil roll comprising a conductor that is joined to one of said substacks by a solid-state metallurgical bond formed by ultrasonic welding.

9. The capacitor of claim 7 in which one of said joints comprises a U-shaped clip embracing the foil extensions of said one joint, said clip comprising two spaced-apart legs at the outer ends of the associated substack joined to the foil extensions of said substack located immediately adjacent said legs by solid-state metallurgical bonds formed by ultrasonic welding.

10. The capacitor of claim 7 in which:
(a) each of said flattened foil rolls includes two walls at opposite sides of a flattened central opening, one of said walls including the foil extensions that are present in said substack of said first joint, and
(b) in said one wall of each foil roll, most of the foil extensions that are included within the substack of said first joint each have a portion located between the substack and the dielectric film of said roll that extends from the dielectric film toward the outer periphery of the roll.

11. A method of making an extended-foil power capacitor comprising a stack of side-by-side foils rolls, each flattened about a central opening in the roll to provide two walls on opposite sides of said central opening, each foil roll further comprising two sheets of metal foil rolled up in nesting face-to-face relationship and dielectric film positioned between said foil sheets and electrically insulating the two foil sheets from each other, one of said foil sheets in each foil roll extending beyond the dielectric film and beyond the other foil sheets at one end of the foil roll to provide first foil extensions at said one end of said roll, and the other foil sheet in each roll extending beyond the dielectric film and beyond said one foil sheet at the other end of the foil roll to provide second foil extensions at the other end of said roll, said method comprising:
(a) providing an ultrasonic welder comprising (i) a welding tip and an anvil tip that are relatively movable with respect to each other to clamp therebetween work pieces having multiple interfaces and (ii) means effective when said work pieces are clamped together between said tips for applying to said interfaces ultrasonic vibrations,
(b) gathering adjacent foil extensions in the juxtaposed walls of two juxtaposed foil rolls and forming from said gathered extensions a substack comprising dozens of superposed foil extensions,
(c) clamping said substack between said welding tip and anvil tip, and
(d) applying to the clamped substack ultrasonic vibrations that disrupt surface oxides on the interfaces between said foil extensions in the clamped substack and cause solid state metallurgical bonds to be developed at said interfaces.

12. The method of claim 11 in which:
(a) a U-shaped clip comprising spaced-apart legs is placed over the outer edges of said gathered foil extensions in said substack before step (c) of claim 11 is carried out, thereby locating said legs at the outer ends of said substack and including said legs in said substack,
(b) causing said welding tip and said anvil tip to engage said legs when said substack is clamped between said tips, and
(c) applying said ultrasonic vibrations to the clamped substack through said legs thereby disrupting surface oxides on the interfaces between said legs and the juxtaposed foil extensions and thus developing solid state metallurgical bonds between said legs and said juxtaposed foil extensions.

13. A method of making an extended-foil power capacitor comprising a plurality of flattened foil rolls stacked in side-by-side relationship, each foil roll comprising two sheets of metal foil rolled up in nesting face-to-face relationship and dielectric film positioned between said foil sheets and electrically insulating the foil sheets from each other, one of said foil sheets in each foil roll extending at one end of the roll beyond the dielectric film and beyond the other foil sheet to provide foil extensions at said one end of said roll, said method comprising:
(a) providing an ultrasonic welder comprising (i) a welding tip and an anvil tip that are relatively movable with respect to each other to clamp therebetween work pieces having multiple interfaces and (ii) means effective when said work pieces are clamped together between said tips for applying to said interfaces ultrasonic vibrations,
(b) gathering adjacent foil extensions and forming from said gathered extensions a substack comprising dozens of superposed foil extensions,
(c) clamping said substack between said welding tip and said anvil tip, and
(d) applying to the clamped substack ultrasonic vibrations that disrupt surface oxides on the interfaces between said foil extensions in the clamped substack and cause solid-state metallurgical bonds to be developed at said interfaces.

14. A method as defined in claim 13 and further comprising connecting by the following step an end conductor to a foil roll within said stack that has its foil extensions gathered in the substack recited in claim 13:
(a) placing said end conductor in contact with said substack after steps (c) and (d) of claim 13 have been performed,
(b) squeezing the combination of said end conductor and said substack between the welding tip and the anvil tip of an ultrasonic welder, and
(c) during said squeezing applying to said latter welding tip ultrasonic vibrations that disrupt surface oxides on the interface between said substack and said end conductor and cause a solid-state metallurgical bond to be developed at said latter interface.

15. The method of claim 13 in which:
(a) a U-shaped member comprising spaced-apart legs is placed over the outer edges of said gathered foil extensions in said substack before step (c) of claim 13 is carried out, thereby locating said legs at the outer ends of said substack and including said legs in said substack,
(b) causing said welding tip and and said anvil tip to engage said legs when said substack is clamped between said tips, and
(c) applying said ultrasonic vibrations to the clamped substack through said legs thereby disrupting surface oxides on the interfaces between said legs and the juxtaposed foil extensions and thus developing solid-state metallurgical bonds between said legs and said juxtaposed foil extensions.

16. The method of claim 13 in which:
(a) said gathering involves gathering the foil extensions at one end of each foil roll in a substack comprising dozen of superposed foil extensions,
(b) a metal strip comprising U-shaped portions, each comprising spaced legs, is positioned on the ends of the foil rolls so that the U-shaped portions of the strip respectively embrace groups of gathered foil extensions, thereby forming substacks each comprising a group of gathered foil extensions and the legs of the associated U-shaped member,
(c) each of said substacks is clamped between said welding tip and said anvil tip so that said tips engage said legs of the associated substack, and
(d) ultrasonic vibrations are applied to each of said clamped substacks through said legs thereby disrupting surface oxides on the interfaces between said legs and the juxtaposed foil extensions and on the interfaces between juxtaposed foil extensions, thereby developing on said interfaces solid-state metallurgical bonds.

17. An extended-foil power capacitor comprising two flattened foil rolls stacked in juxtaposed side-by-side relationship, each foil roll comprising first and second sheets of metal foil rolled up in nesting face-to-face relationship and dielectric film positioned between said foil sheets and electrically insulating the foil sheets from each other, said first foil sheet extending beyond the dielectric film at one end of the foil roll to provide first foil extensions at said one end of said foil roll and said second foil sheet extending beyond the dielectric film at the other end of the foil roll to provide second foil extensions at the other end of said foil roll, and in which:
(a) said two foil rolls are positioned with respect to each other so that at said one end of said two juxtaposed foil rolls, said first foil extensions of the two rolls are located adjacent each other,
(b) at said one end of one of the two rolls, there is a first joint formed by ultrasonic welding joining together the first foil extensions of said one roll,
(c) said first joint comprises a substack of of dozens of superposed foil extensions joined together by solid-state metallurgical bonds at the interfaces between juxtaposed foil extensions; and
(d) connecting means is provided for electrically interconnecting said first joint and first foil extensions of the juxtaposed foil roll.

18. The capacitor of claim 17 in which said first joint comprises a U-shaped member embracing the foil extensions of said first joint, said U-shaped member comprising two spaced-apart legs at the outer ends of the associated substack joined to the foil extensions of said substack located immediately adjacent said legs by solid-state metallurgical bonds formed by ultrasonic welding.

19. The capacitor of claim 18 in which the first foil extensions of said juxtaposed foil roll are joined together by a second joint formed by ultrasonic welding, said second joint comprising a substack of dozens of superposed foil extensions joined together by solid-state metallurgical bonds at the interfaces between juxtaposed foil extensions.

20. The capacitor of claim 19 in which:
(a) said second joint comprises a second U-shaped member embracing the foil extensions of said second joint and comprising two spaced-apart legs at the outer ends of the associated substack joined to the foil extensions of said substack located immediately adjacent said legs by solid-state metallurgical bonds formed by ultrasonic welding, and
(b) said connecting means comprises a strip of metal that includes said two U-shaped members as parts thereof.

* * * * *

UNITED STATES PATENT AND TRADEMARK OFFICE
CERTIFICATE OF CORRECTION

PATENT NO. : 5,041,942
DATED : August 20, 1991
INVENTOR(S) : Philip H. Carrico

It is certified that error appears in the above—identified patent and that said Letters Patent is hereby corrected as shown below:

Column 11, line 11, "superposed of" should read -of superposed-

Column 12, line 9, after "dozens" the following should be inserted -of-

Signed and Sealed this

Third Day of November, 1992

*Attest:*

DOUGLAS B. COMER

*Attesting Officer*     Acting Commissioner of Patents and Trademarks